United States Patent [19]
Valdez

[11] Patent Number: 5,396,713
[45] Date of Patent: Mar. 14, 1995

[54] COMBINED DECORATIVE ARTICLE, PUZZLE AND STENCIL

[76] Inventor: Eric F. Valdez, 6125 W. Orange St. #205, Los Angeles, Calif. 90048

[21] Appl. No.: 4,791

[22] Filed: Jan. 14, 1993

[51] Int. Cl.$^6$ .................. G01B 3/14; B43L 13/20; B32B 3/10; G09B 11/00
[52] U.S. Cl. .......................... 33/565; 33/562; 428/53; 428/54; 428/16; 428/12; 434/85; 434/87; 434/88
[58] Field of Search .................. 33/565, 562, 564; 35/26; 428/53, 54; 446/471, 101; 434/85, 87, 88

[56] References Cited

U.S. PATENT DOCUMENTS

| | | | |
|---|---|---|---|
| 2,493,697 | 1/1950 | Raczkowski | 273/156 |
| 3,301,725 | 1/1967 | Frontera | 156/59 |
| 3,633,286 | 1/1972 | Maurer | 35/26 |
| 4,205,849 | 6/1980 | Perkins | 434/87 |
| 4,610,096 | 9/1986 | Sahler et al. | 33/565 |
| 4,986,789 | 1/1991 | Hang | 446/470 |

*Primary Examiner*—George F. Lesmes
*Assistant Examiner*—Kathryne E. Shelborne
*Attorney, Agent, or Firm*—Christie, Parker & Hale

[57] ABSTRACT

A set of thin, flat stencil plates are stacked together face-to-face to form a three-dimensional article shaped as a decorative article. The stencil plates are held together in the three-dimensional form by a connecting member or by frictionally interlocking them to one another. The stencil plates each contain one or more apertures of unique shapes, so the plates can be disassembled from the three-dimensional form and used individually as separate stencils. The stencil plates have peripheral outer surfaces which cooperate to form the three-dimensional shape of a selected design figure when the plates are assembled in a particular sequence, and the article, in its assembled form, conceals the stencils contained inside the finished three-dimensional article. The invention has use as a puzzle in stacking together the stencil plates in the proper sequence, and the finished article can be an art object or a toy, for example. In other forms, three-dimensionally shaped articles of unique design shape can be formed by interlocking sets of stencil plates lying face-to-face in a stack, or interlocked edge-to-edge to form an elongated three-dimensional article.

10 Claims, 11 Drawing Sheets

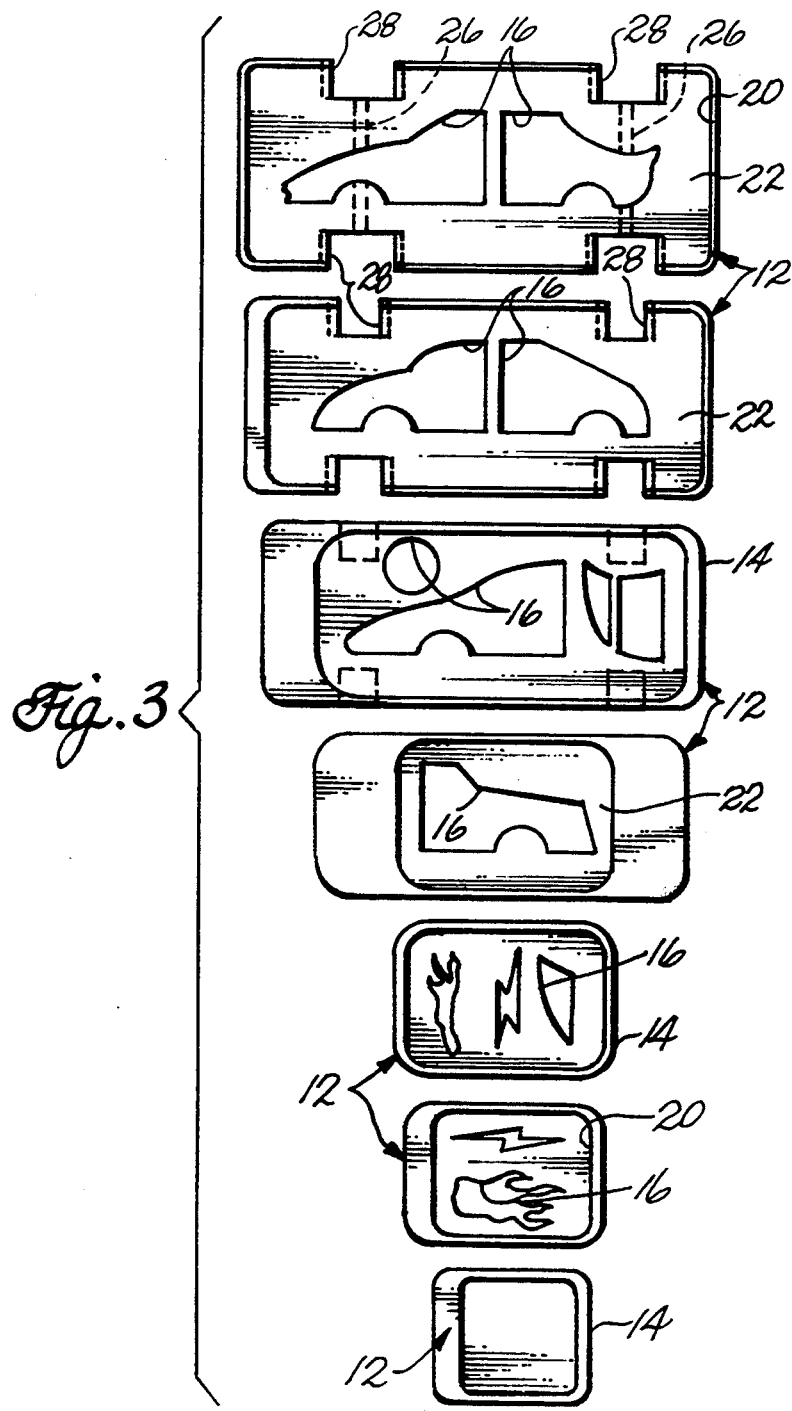

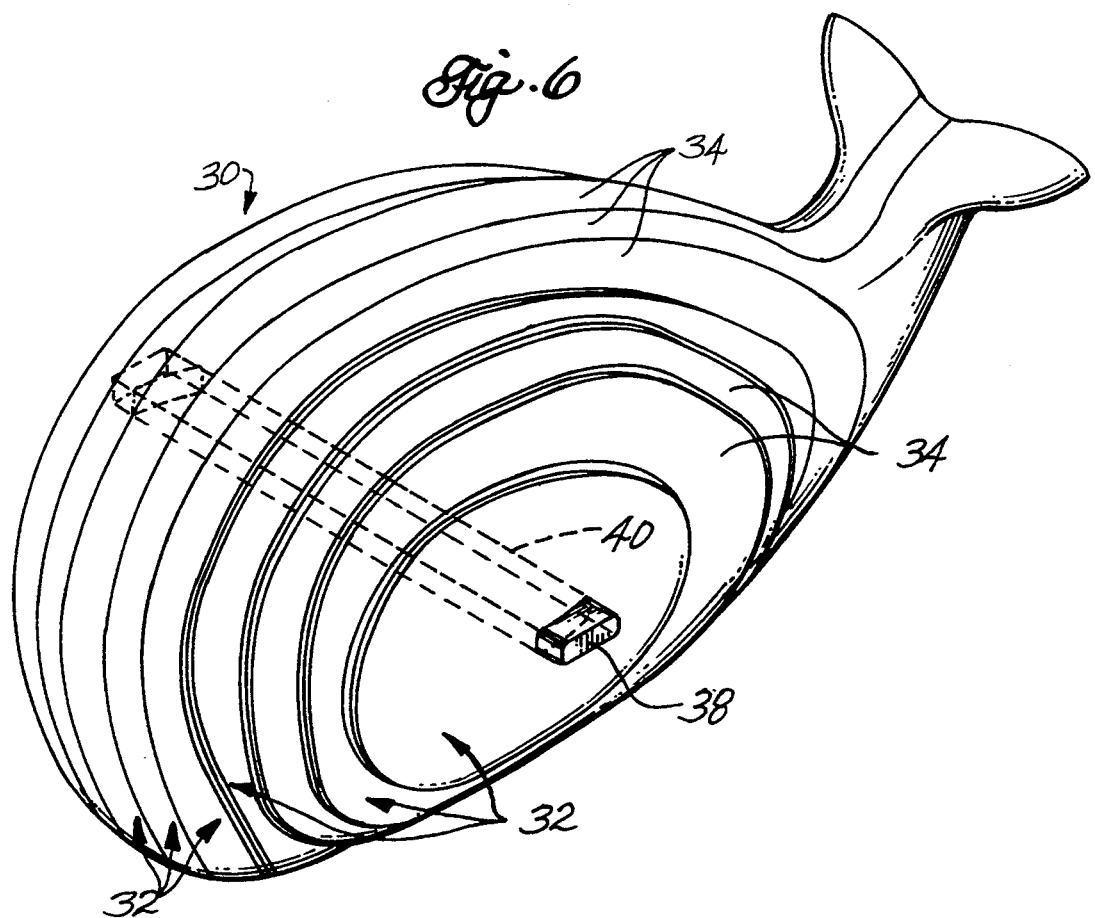
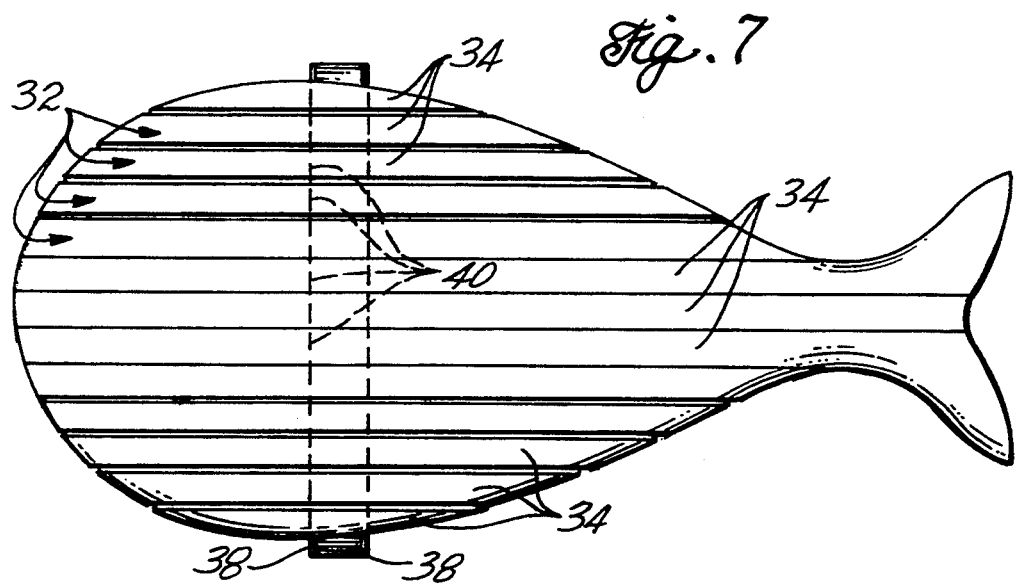

COMBINED DECORATIVE ARTICLE, PUZZLE AND STENCIL

FIELD OF THE INVENTION

This invention relates to an article assembled from a plurality of stencil plates to form a three-dimensional design figure which can be taken apart so the plates can be used as individual stencils, and re-assembled into the shape of the three-dimensional article in a manner similar to a puzzle.

BACKGROUND OF THE INVENTION

Stencils to aid in drawing figures of various shapes are particularly useful for children in developing their eye-hand coordination and, in some instances, for developing their artistic creativity. When a child uses existing stencils, he or she may draw with them for a while, but when the child tires or loses interest, the stencils may be put away or set aside and possibly used again at a later time if and when the child is interested in drawing with them. The present invention is based on a recognition that currently existing stencils can be expanded in their use to produce more interest and develop more skills on the part of children, by providing stencil plates in a combination having additional functions other than being used as conventional stencils. The invention thus adds play value and can spark the interest in children to reuse the features of the stencils, as well as providing further sources of eye-hand coordination development. Stencils are constructive because, at the same time that they help children to achieve results they could not obtain by drawing free-hand, stencils also allow them to see what they draw as it should look, while at the same time training them to use their visual and motor skills. The present invention provides stencil plates that can be assembled in a select order or sequence similar to a puzzle to form a three-dimensionally shaped article that can be used as a toy or other plaything and, when taken apart, the plates can be used as individual stencils to develop drawing or other creative skills.

SUMMARY OF THE INVENTION

Briefly, one embodiment of the invention comprises a combined three-dimensional article, puzzle and stencil comprising a set of thin plates stacked together face-to-face so that outer peripheral surfaces of the plates cooperate to form a three-dimensional decorative article having a selected design shape. The plates have one or more apertures capable of guiding a writing implement when the plate is used as a stencil. Each plate in the stack has an opening extending through it so the openings of adjacent plates in the stack can be aligned to receive a connecting member inserted into the adjacent openings to hold the stacked plates together in a sequence that forms the selected design shape. The plates are removable from the connecting member to use individually as stencils and can be reassembled in order on the connecting member to use as a puzzle in re-assembling them into the three-dimensionally shaped article.

In one form of the invention, the outer surfaces of the stencil plates cooperate to form a generally contoured outer surface of a three-dimensional article which conceals the stencils contained inside the stacked-together three-dimensional article.

In another form of the invention, the stencil plates can be assembled together by frictionally interlocking with one another as an alternative to using the connecting member.

As mentioned previously, the invention can be used by taking apart the stencil plates to use them as individual stencils and to assemble them back again into the finished article. This develops eye-hand coordination and creativity in a manner similar to assembling a puzzle. The invention otherwise serves as an art object or toy in its three-dimensional form.

One advantage of the invention is that the three-dimensional form of the object can be shaped as a certain recognizable form and the individual stencils can be in shapes of forms, articles, things, animals, etc., within a theme related to three-dimensional article itself. In this way, the stencils can be used to create murals or other works of art having a common theme, which enhances development of creativity in the child using the invention.

These and other aspects of the invention will be more fully understood by referring to the following detailed description and the accompanying drawings.

BRIEF DESCRIPTION OF THE DRAWINGS

FIG. 3 is a top view of the unassembled stencil plates lying side-by-side and completely revealing the stencils contained within the toy.

FIG. 6 is a perspective view illustrating an alternative form of the invention, in which the three-dimensional object is shaped as a whale, divided vertically into a set of stacked stencil plates.

FIG. 7 is a top view of the article shown in FIG. 6.

DETAILED DESCRIPTION

Figure 1:
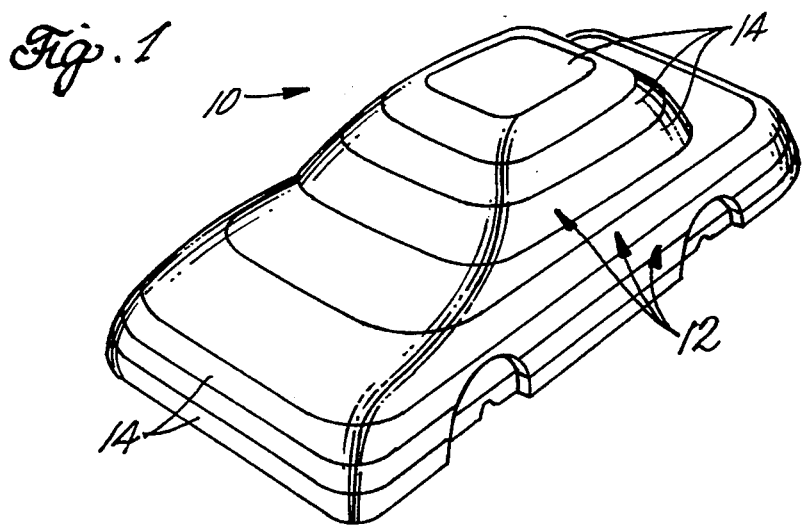
FIG. 1 is a perspective view showing the invention in its three-dimensional shape formed as a toy car when assembled.
Figure 2:
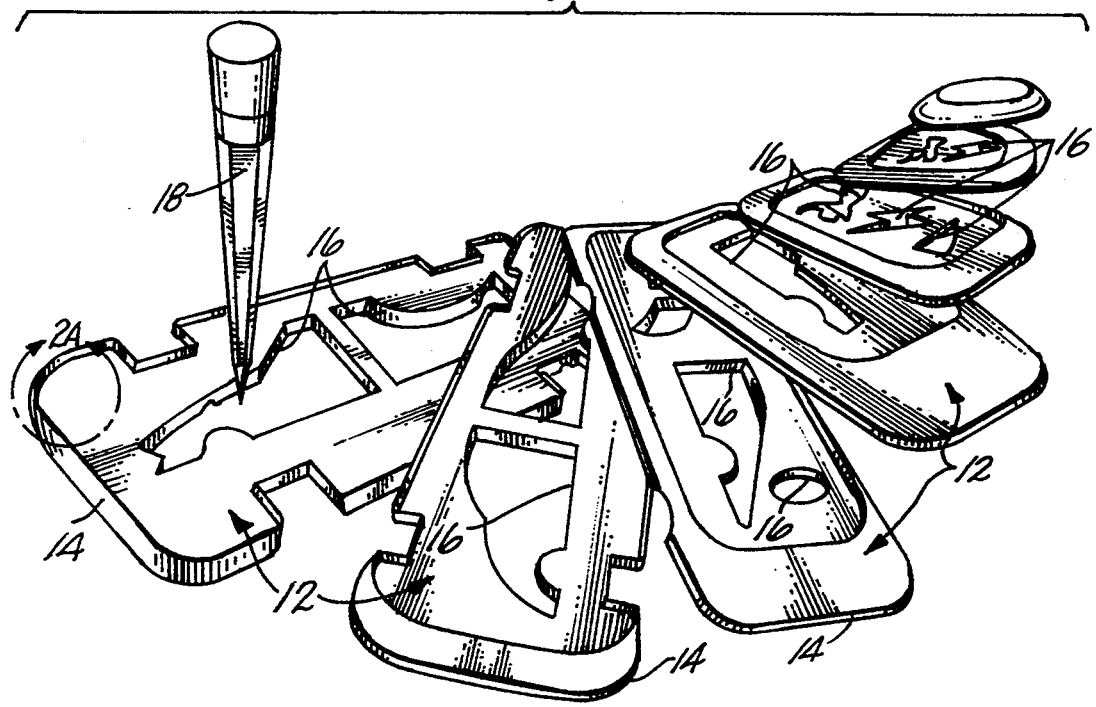
FIG. 2 is an exploded view of the toy car partially revealing the stencils within the stencil plates that are assembled to make up the toy car.

FIG. 1 illustrates the three-dimensionally shaped article 10 in the shape of a toy car formed by a vertical stack of stencil plates 12. The stencil plates are thin flat plates with parallel top and bottom faces joined face-to-face in the stack. The outer peripheral edges 14 of the stencil plates cooperate to form the three-dimensional shape of the toy car when the stencil plates are assembled by stacking them together vertically in a select sequence. The stencil plates contained in the stack shown in FIG. 1 can be disassembled by removing them from the stack. FIG. 2 shows the individual stencil plates side-by-side after having been disassembled, which reveals one or more stencil apertures 16 formed in the unique design shapes to provide a set of stencils. FIG. 2 also shows a pencil 18 for use in the following closed configuration of any of the different stencil apertures to draw the shapes of objects on a piece of paper or the like, in the well-known manner. Referring again to FIG. 1, when the individual stencil plates are stacked together to form the toy car, the individual stencil apertures 16 are spaced inwardly from the outer peripheral edges 14. These edges of the individual stencil plates are preferably opaque and the plates are stacked such that they cooperate to conceal the stencils contained internally within the stacked article 10.

Figure 2A:
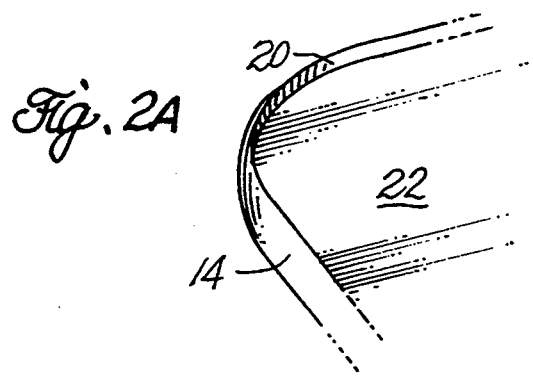
FIG. 2A is a fragmentary enlarged view showing a corner of a stencil plate.
Figure 5:
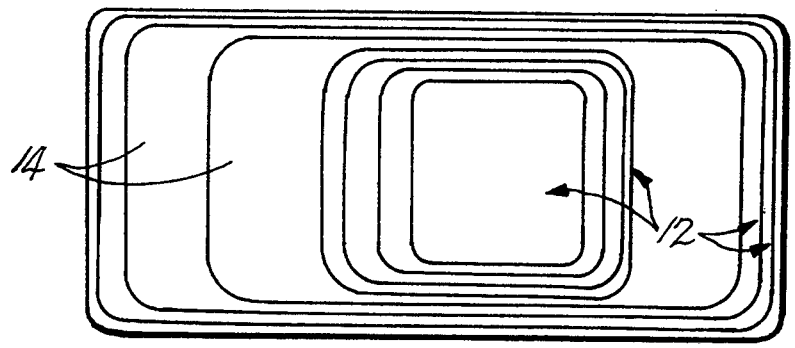
FIG. 5 is a top view of the assembled toy car.

FIG. 2A is an enlarged perspective view of a corner of a typical stencil plate, showing a "blunt safety edge" 20 formed around the periphery of the stencil plates. According to this feature, the peripheral wall 14 of each stencil plate 12 projects above a recessed flat face 22 containing the stencil apertures 16. The projecting peripheral edge of adjacent plates in the stack provide a lid or a cap to conceal the stencil apertures 16 internally within the stack and also provide a means to frictionally interlock the stencils to one another when they are arranged in the stack.

FIG. 3 shows the individual stencil plates 12 lying side-by-side disassembled from the stack shown in FIG. 1. These views of the stencil plates 12 show the individual uniquely shaped stencil apertures 16 extending through the recessed flat faces 22 with the projecting peripheral edges 20 and the contoured outer surfaces 14 of the individual stencil plates. The plate shown at the bottom of FIG. 3 is a plate which does not contain a stencil, but rather serves as a lid or cap to conceal the stencils within the other plates in the stack when the stencil plates are assembled. The stencil at the bottom of FIG. 3 fits into and interlocks frictionally with the next stencil plate adjacent to it in the order shown in FIG. 3 and so on, so that each stencil plate in sequence can be interlocked with the next stencil plate in the stack, resulting in a completely interlocked set of stencil plates when assembled in the stack shown in FIG. 1. FIG. 3 also shows the unique designs of various stencils having features of cars which can include wheels, window sections, body panels, bumpers, and the like.

Figure 4:
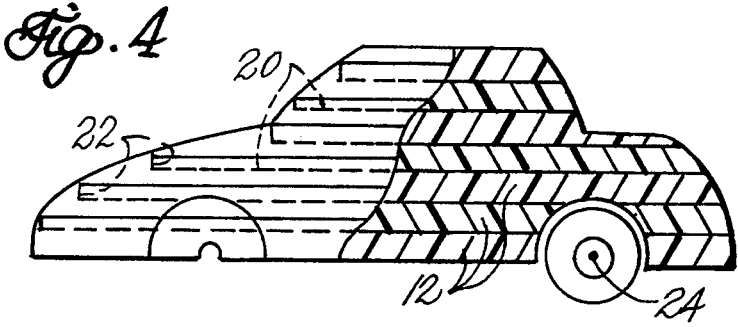
FIG. 4 is a side view of the toy car in its assembled form with a rear axle in place.
Figure 4A:
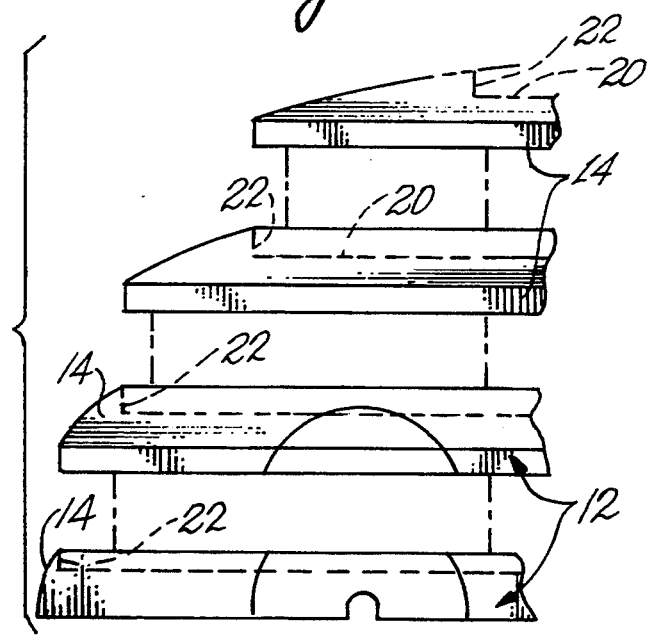
FIG. 4A is an enlarged view of means for frictionally interlocking the stencils together in the assembled form of the toy.

The friction fit among stencil plates can be seen in the enlarged view of FIG. 4 that is designated FIG. 4A. This shows a side view of the stencil plate holding means referred to as a friction fit. The friction fit refers to the frictional engagement of the tops of each stencil plate with the bottom of the stencil plate above it. As is common with most stencils, the aperture 16 goes the whole way through the material so as to form an open space in the interior of the stencil that can be used to guide the pen or other writing implement. With the aperture cut in the middle, the remaining material 20 surrounding the aperture is known as the "outer portion." This is similar to most ordinary stencils.

In the stencils of the present invention, a portion of the top of the "outer portion" 20 of each stencil plate is cut out so as to leave the peripheral edge 22 or a "raised up edge" that borders the top edge of the outer portion of each stencil plate. The cut out portion referred to is thus on the inside of the "outer portion." In contrast to the aperture, it does not extend the whole way through the thickness of the material but is merely lower than the raised up edge of the outer portion and surrounds the aperture. The cut out portion of the outer portion of the stencil plate is made slightly larger than the bottom edge of the stencil plate that is stacked next above it when the plates are stacked in their normal order, as shown in FIG. 4A.

The cut out portion is shown in perspective in FIG. 2A. This shows the raised-up edge of the stencil plate that is higher than the cut out portion that surrounds the aperture. This is so that the outside of the bottom edge of the stencil plate that is above it will fit in tightly with the inner edge of the raised up portion shown in FIG. 2A. This frictional engagement is the friction fit.

When FIG. 2A is viewed with the rest of FIG. 2 it can be seen that the raised-up edge goes entirely around the edge of each stencil plate, except for the top plate. The top plate as shown in FIG. 2 does not have to frictionally engage a plate above it, so the raised-up edge on it is unnecessary.

The simulative model shown in FIG. 4 is one of a toy auto. The wheels of the auto are held by an axle 24 that goes through one of the plates. The plate that it goes through has a cut out portion 26 extending laterally across the plate. This is shown with dotted lines in the plates shown in FIG. 3. Of course, the cut out portions stop where they meet the apertures as shown. The axle fits through the stack by fitting into the lateral cut out portion. The simulated wheel is held to the axle by the holding pin, a side view of which is shown in FIG. 4. The pin fits through a hole in the center of the tire, which can be made of an eraser. Eraser material is used in this example since it would be useful in connection with a stencil, but any material that works as a simulative material could be used. The pin may be held within the axle through a threaded portion inside the axle. However, any means, such as a snap-locking piece, that can hold simulative pieces together will do. The wheel is fit within the sides of the stack of plates. Those sides of the plates that correspond to the areas that the wheel fits into are cut out at 28 so that spaces are created in the sides of plates that can hold the wheels.

FIGS. 6 through 20 illustrate an alternative form of the invention in which a three-dimensionally shaped decorative article 30 is in the form of a whale made from a stack of stencil plates 32. In this embodiment, the thin, flat stencil plates are assembled side-by-side horizontally and extend in upright vertical planes across the width of the three-dimensionally shaped figure. When the plates are aligned face-to-face against each other in the proper order, they form the three-dimensional shaped whale figure of FIG. 6.

FIG. 7 is a top view illustrating how the peripheral outer edges 34 of the individual stencil plates are contoured to cooperate with each other to form the whale figure. The outer surfaces 34 are a major wall thickness portion of each of the stencil plates in the stack and they cooperate to conceal the stencil apertures 36, shown in FIGS. 9 through 19. FIGS. 6 and 7 also show an elongated rigid connecting member 38 extending through aligned openings 40 across the width of the stacked stencil plates for use in holding together the individual stacked stencil plates in the assembled configuration. The connecting member 38 can make a sufficiently tight friction fit or can be contoured (in a shape other than straight) so as to provide a means for resisting sideways movement of the stacked stencil plates for holding them together when they are aligned in the stack.

FIGS. 9 through 19 show embodiments of the stencil plates 32 containing stencil apertures 36 in various forms. In the illustrated embodiment, the stencil apertures 36 are in the form of various unique designs for illustrating selected forms of sea life to carry out a common theme with the form of sea life embodied in the shape of the whale 30. One of the advantages of the stencil plates 32 is that the large number of stencils available can be used to draw murals or other theme pictures involving the shapes of various types of sea life.

In the illustrated embodiment, certain views of the stencil plates 32 show the stencil apertures 36 extending through the entire depth of a flat face 42 of the stencil plate which is recessed relative to an upright edge 44 extending inboard from the outer periphery of the stencil plate and enclosing the flat face 42 of the stencil which is recessed below the boundary formed by the upright edge 44. FIGS. 8 through 20 also show the individual openings 40 which are aligned when the stencil plates are formed in a stack to provide an opening extending through the stacked article for receiving the connecting member 38. These openings 40 are closely configured to the exterior shape of the connecting member and these openings are separate from the unique design shapes of the stencil apertures 36.

Figure 8:
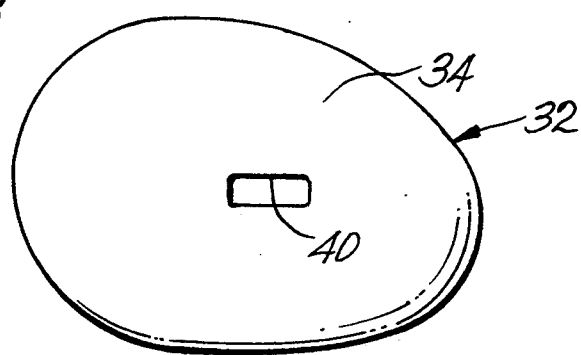
FIGS. 8 through 20 are a series of stencil plates which, when assembled together, form the article of FIG. 6 and which, as shown in FIGS. 9 through 19, illustrate various embodiments of stencils contained in the stencil plates.
Figure 9:
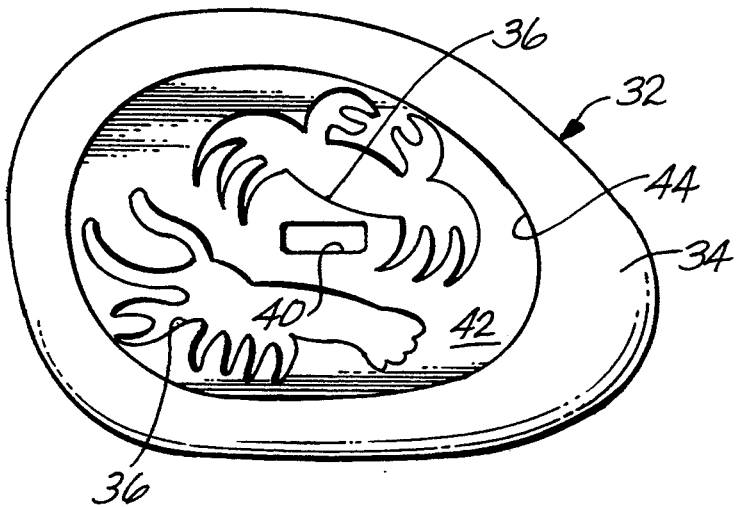
Figure 10:
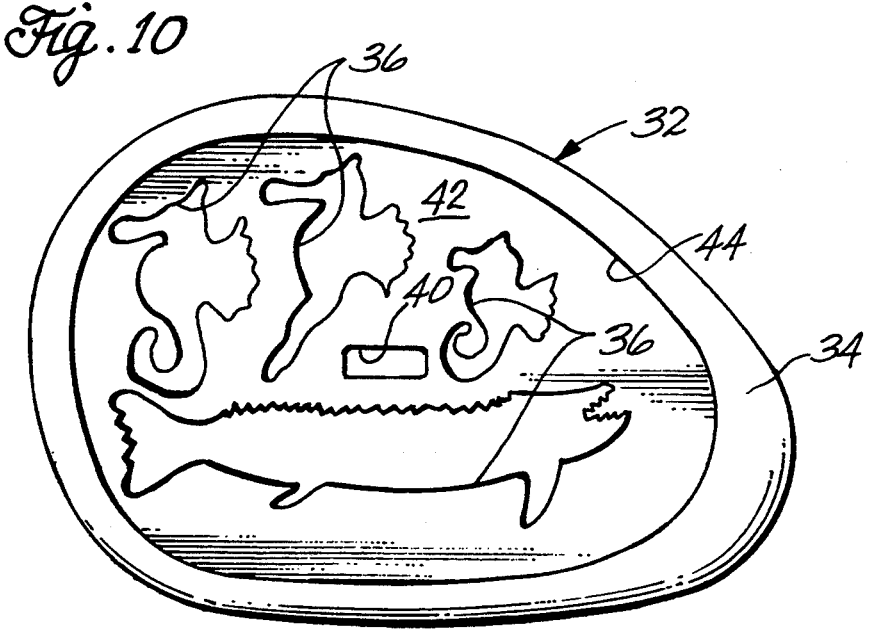
Figure 11:
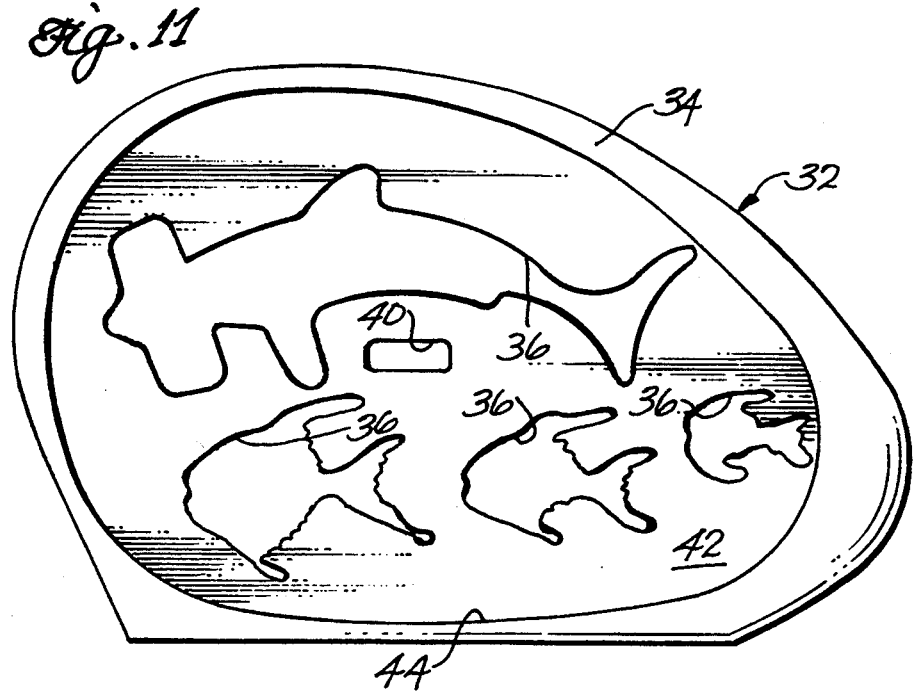
Figure 12:
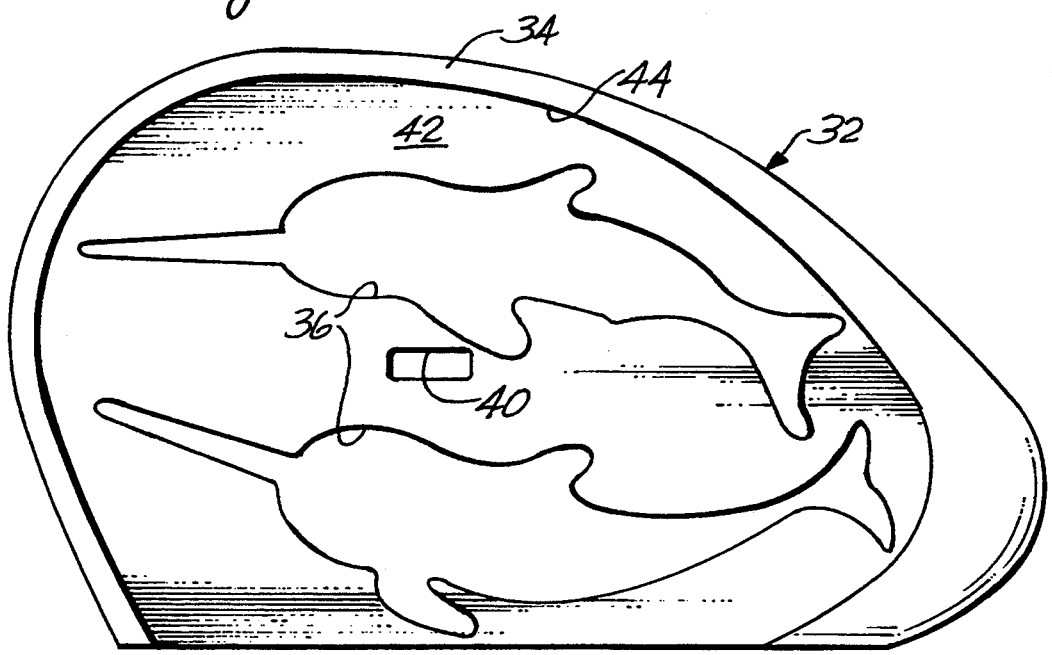
Figure 13:
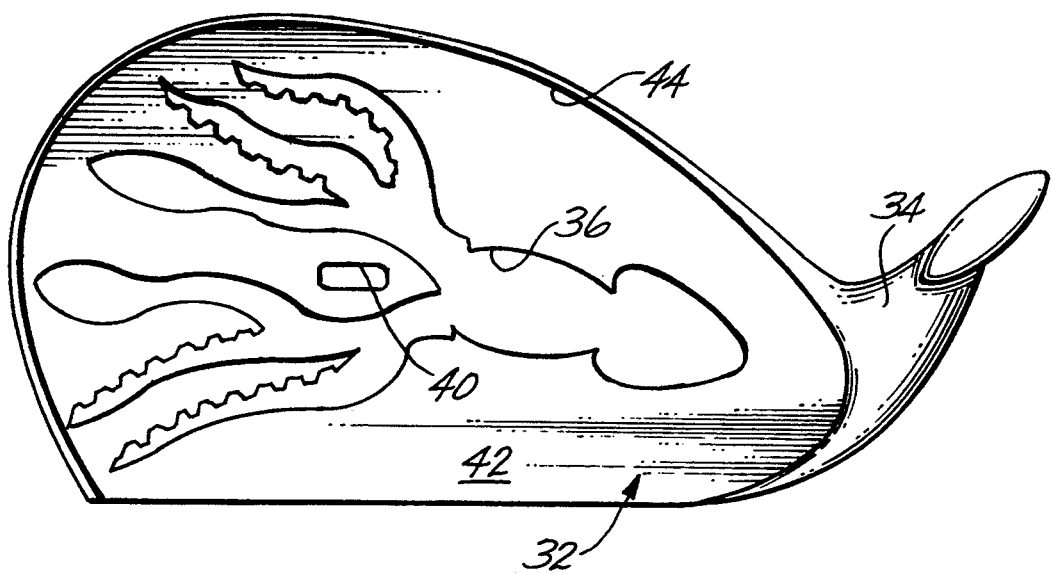
Figure 14:
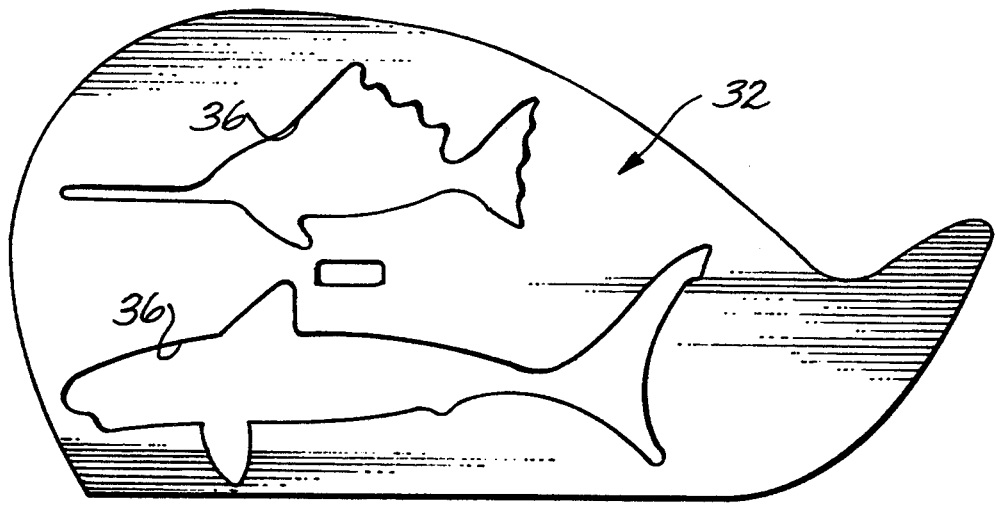
Figure 15:
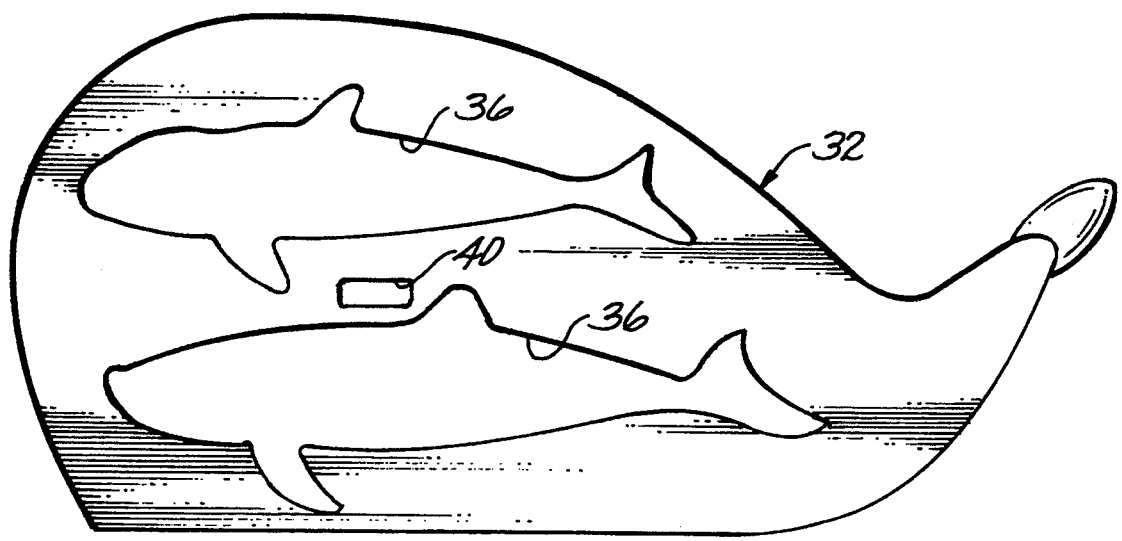
Figure 16:
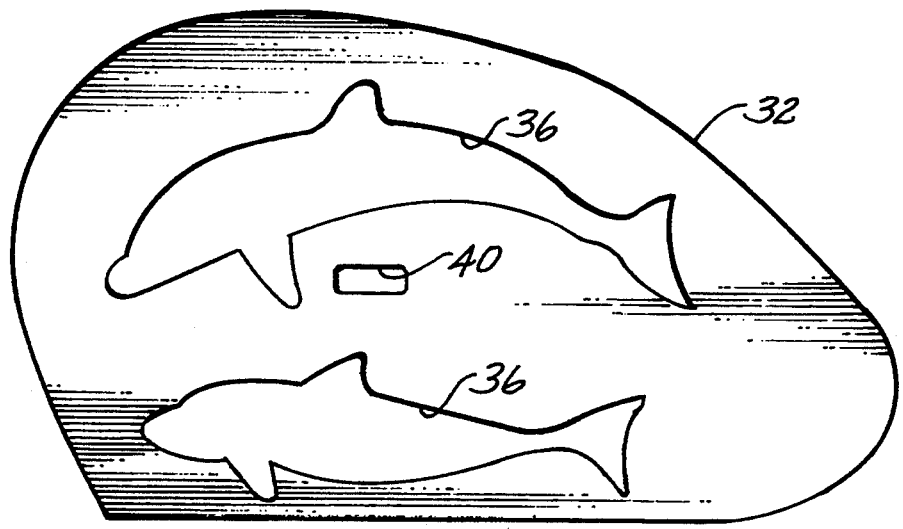
Figure 17:
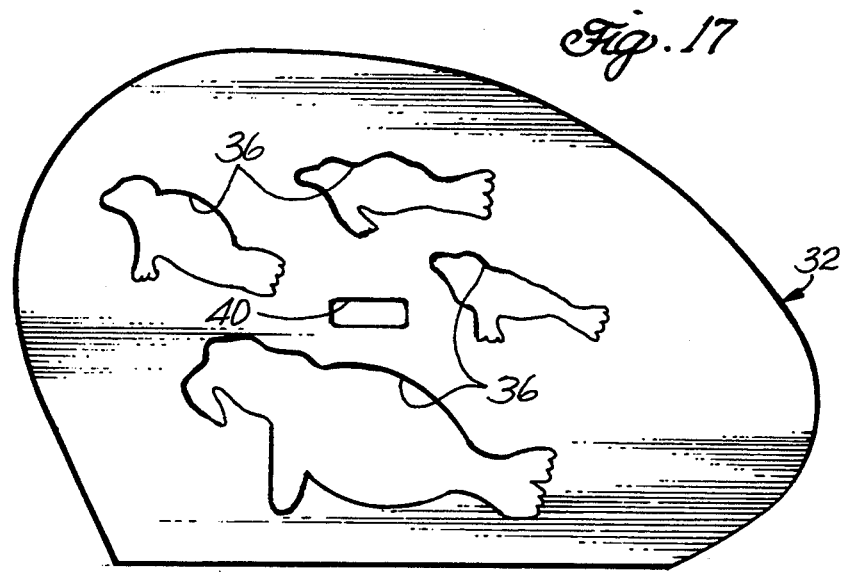
Figure 18:
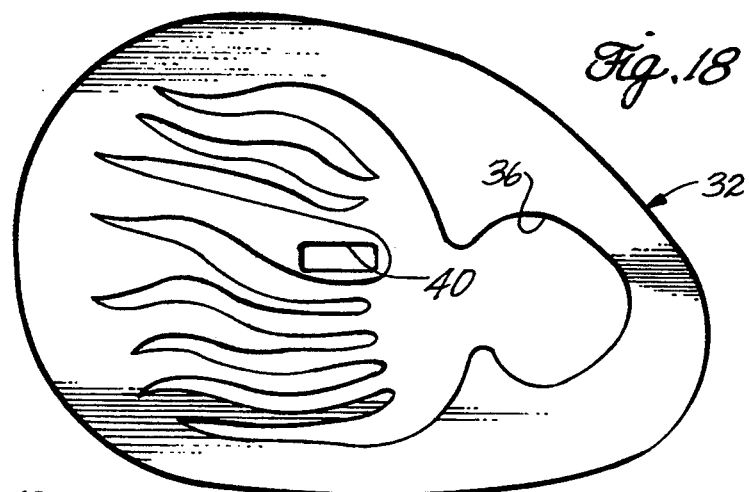
Figure 19:
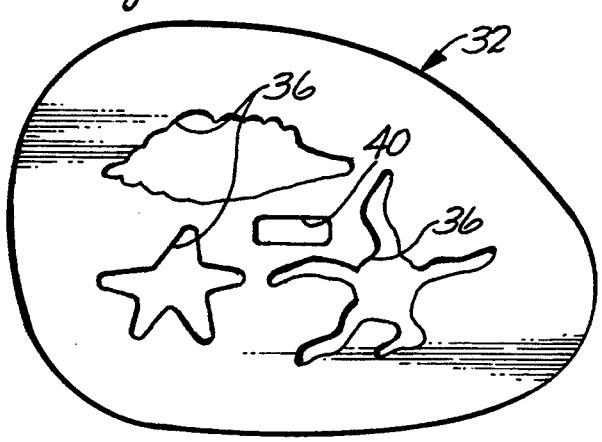
Figure 20:
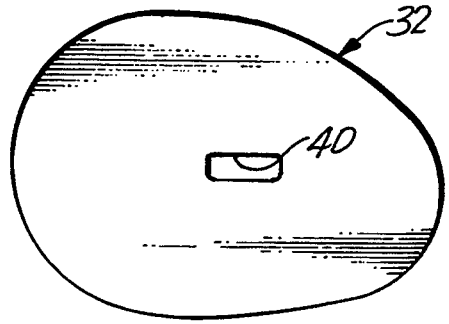

FIGS. 8 and 20 illustrate the outermost plates in the stack that form opposite ends of the whale figure while concealing the stencils contained within the interior of the finished three-dimensional figure.

Figure 21:
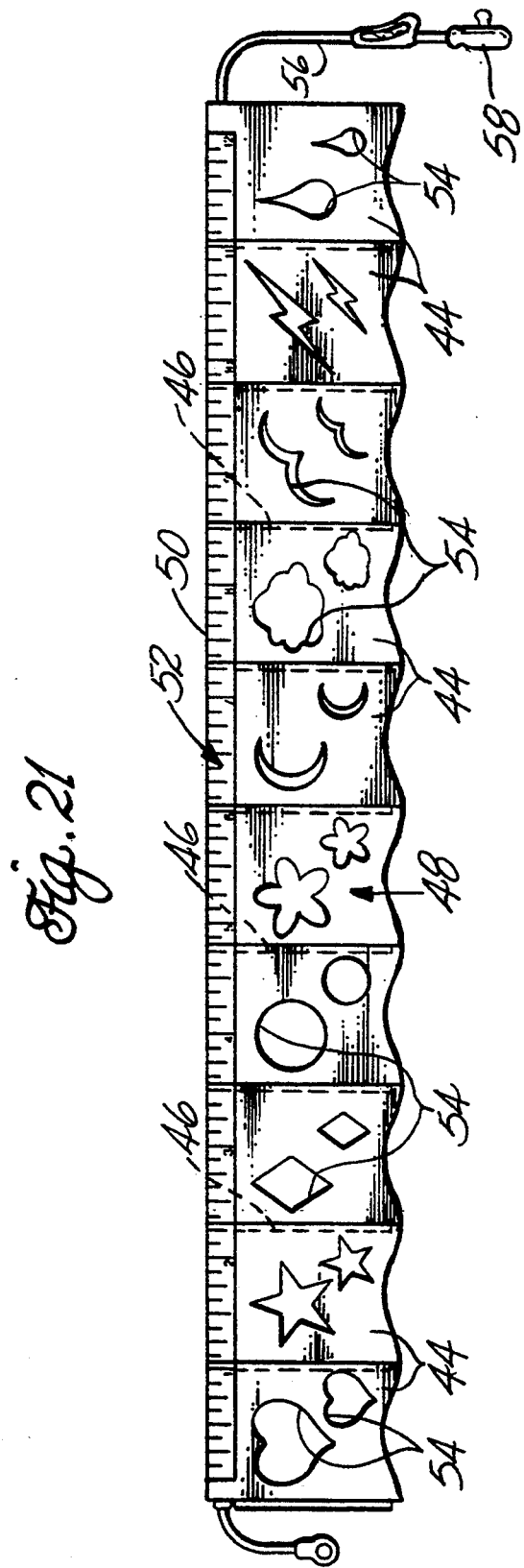
FIG. 21 is an alternative form of the invention in which a drawstring connects together a series of stencil plates.
Figure 22:
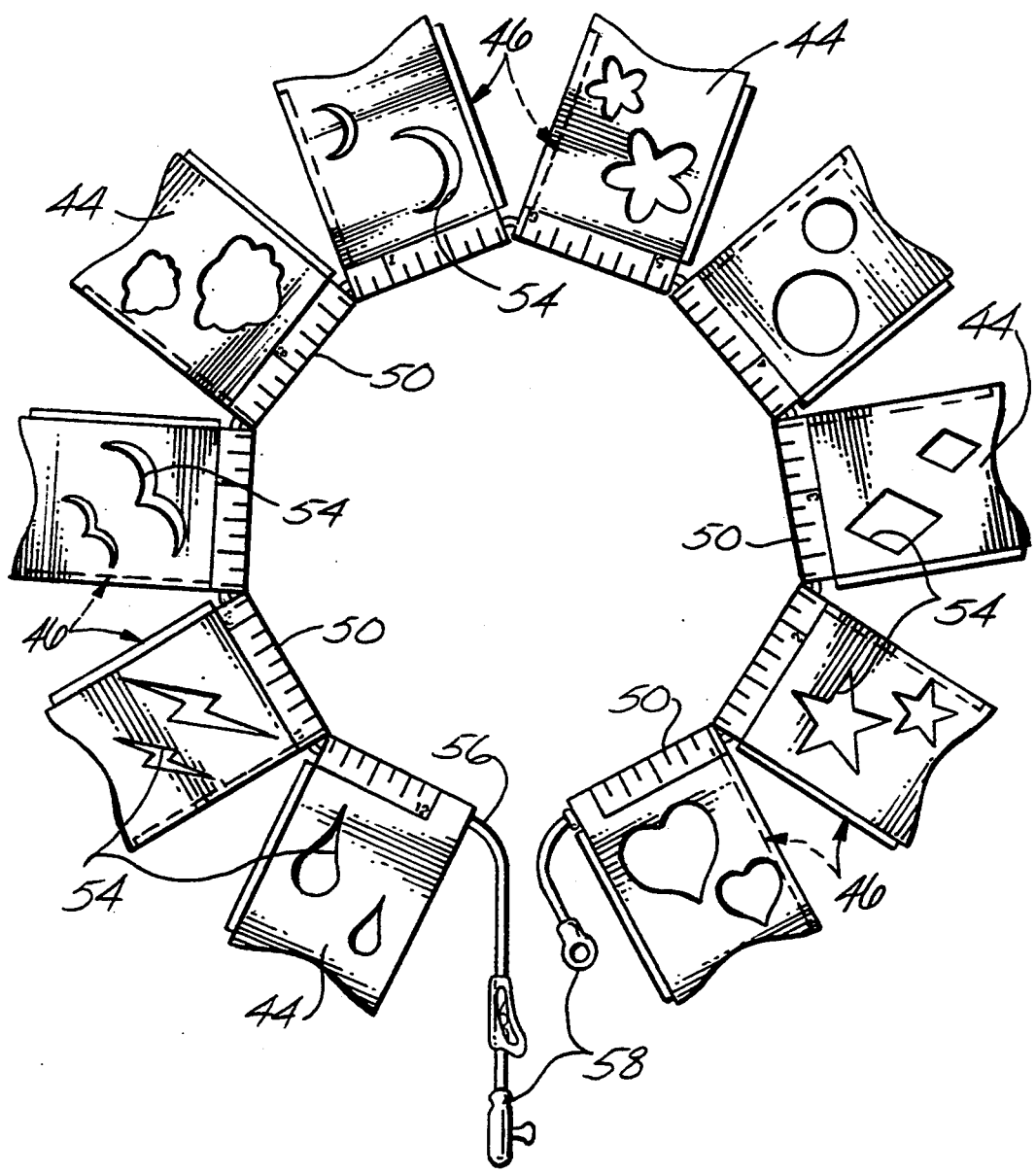
FIG. 22 is an elevation view of the article shown in FIG. 21 in which the stencil plates are in the form of a necklace.

FIGS. 21 and 22 illustrate a further embodiment of the invention in which a plurality of stencil plates 44, preferably rectangular in shape, are interlocked side-by-side to lie in a flat plane. The rectangular flat plates each have cooperating tongue-and-groove arrangements 46 at their juncture where adjacent stencil plates are interlocked together. This forms a long, narrow, straight piece 48 which is segmented along its length and can have printing along a common straight edge 50 to form a simulated ruler 52 when the pieces are interlocked in a selected order. Each of the stencil plates has one or more stencil openings 54 of unique design shape. In the illustrated embodiment, these designs are recognizable figures of interest to children. The assembled and interlocked stencil plates 44 are preferably held together by a common draw-string 56 which extends through an aligned aperture (not shown) along a common side of the stencil plates. As shown in FIG. 22, the stenciled plates can be taken apart and the draw string 56 used with fastening means 58 at its ends to form a necklace.

Other three-dimensional figures can be formed from a variety of stencil plates by these or other techniques without departing from the scope of the invention.

What is claimed is:

1. A combined three-dimensional decorative article, puzzle and stencil, comprising a set of thin plates stacked together face-to-face so that outer peripheral surfaces of the plates cooperate to form a three-dimensional contoured shaped article with a recognizable form, the individual plates being of different shapes stacked together in a given sequential arrangement required to form said shaped article, the plates having opposed generally flat surfaces with one or more apertures of unique shape extending through the plate between opposing flat surface areas on the plate, in which each aperture is capable of guiding a writing implement when the plate is used as a stencil, the unique shapes of the apertures representing objects having a common theme related to the recognizable form of the shaped article, and connecting means for holding the plates together in an order that forms said three-dimensional shape of the shaped article, the stacked stencil plates in the form of said three-dimensional shape concealing the apertures which are contained internally within the shaped article, the plates being removable from the connecting means to use individually as separate stencils and to be stacked together in said sequential arrangement for use as a puzzle when forming said shaped article.

2. The article, puzzle and stencil according to claim 1 in which the plates are thin, flat and the interfaces between adjacent plates extend generally in vertical planes when the simulative shape is in an upright position.

3. The article puzzle and stencil according to claim 1 in which the connecting member is a rigid bar extending substantially normal to the planes of the stencil plates.

4. The article puzzle and stencil according to claim 3 in which the openings for the connecting member are separate from the apertures forming the stencil apertures.

5. The article puzzle and stencil according to claim 1 in which outer peripheral surfaces of the stencil plates cooperate to form a generally contoured outer surface of the three-dimensional article, which conceals the stencil apertures contained inside the stacked three-dimensional article.

6. A set of stencil plates stacked in a given sequence to form a three dimensional contoured article with a shape having a recognizable form, comprising:

stencil plates, said plates having an outer portion and an aperture, each plate having opposed generally flat surfaces with the aperture extending through the plate between opposing flat surface areas on the plate, said aperture capable of guiding a writing implement when said stencil plate is used as a stencil, the outer portion of the stencil plate having an upper part, the upper part of said outer portion having a cut out portion and a raised up portion, said cut out portion being on an inner edge of said outer portion and encircling said aperture, said raised up portion on the upper, outer edge of said outer portion, said raised up portion of the stencil plate capable of frictionally engaging a bottom, outer edge of the outer portion of the stencil plate above it in the stack, the plates being stacked together in said given sequence to form a puzzle in the correct sequential arrangement required to form said three-dimensional contoured shape, the stencil apertures having unique shapes representing objects having a common theme related to the recognizable form of the shaped article, the stacked stencil plates in the form of said three-dimensional contoured shape concealing the stencil apertures which are contained internally within the shaped article.

7. The apparatus of claim 6 wherein said raised up portion is continuous around the upper outer edge of said outer portion.

8. The apparatus of claim 7 wherein said stack of stencil plates has a top plate, said top plate capable of frictionally fitting onto the next highest stencil plate, said top plate being a solid plate.

9. The apparatus of claim 8 wherein the stack of stencil plates is simulative of a car and having an axle piece and a simulative wheel piece, said axle piece capable of extending across the width of the stack, the lowermost plate of said stack having a lateral cut out portion extending across said plate, said lateral cut out portion capable of containing said axle, said axle ends having attaching means capable of holding said wheel piece.

10. The apparatus of claim 9 wherein said attaching means comprise a snap-locking piece.

* * * * *

UNITED STATES PATENT AND TRADEMARK OFFICE
CERTIFICATE OF CORRECTION

PATENT NO. : 5,396,713
DATED : March 14, 1995
INVENTOR(S) : Eric F. Valdez

It is certified that error appears in the above-indentified patent and that said Letters Patent is hereby corrected as shown below:

Column 6, line 50, change "apparatus" to -- stencil plates --.

Column 6, line 53, change "apparatus" to -- stencil plates --.

Column 6, line 57, change "apparatus" to -- stencil plates --.

Column 6, line 66, change "apparatus" to -- stencil plates --.

Signed and Sealed this

Tenth Day of October, 1995

Attest:

BRUCE LEHMAN

Attesting Officer

Commissioner of Patents and Trademarks